United States Patent
Ritchey

(10) Patent No.: US 7,343,754 B2
(45) Date of Patent: Mar. 18, 2008

(54) DEVICE FOR COLLECTING ATMOSPHERIC WATER

(76) Inventor: Jonathan G. Ritchey, 1903 27th Crescent, Vernon, B.C. (CA) V1T 1R3

(*) Notice: Subject to any disclaimer, the term of this patent is extended or adjusted under 35 U.S.C. 154(b) by 157 days.

(21) Appl. No.: 10/516,746

(22) PCT Filed: Jun. 5, 2003

(86) PCT No.: PCT/CA03/00860

§ 371 (c)(1),
(2), (4) Date: Dec. 6, 2004

(87) PCT Pub. No.: WO03/104571

PCT Pub. Date: Dec. 18, 2003

(65) Prior Publication Data

US 2006/0032493 A1    Feb. 16, 2006

Related U.S. Application Data

(60) Provisional application No. 60/385,894, filed on Jun. 6, 2002.

(51) Int. Cl.
*F25D 23/00*    (2006.01)
*F25B 27/00*    (2006.01)

(52) U.S. Cl. .................................. 62/271; 62/235.1

(58) Field of Classification Search .............. 62/92, 62/93, 271, 272, 285, 291, 235.1; 165/10; 95/120

See application file for complete search history.

(56) References Cited

U.S. PATENT DOCUMENTS

| 4,182,132 A | * | 1/1980 | Nasser et al. ............... 62/93 |
| 4,285,702 A | * | 8/1981 | Michel et al. .............. 55/33 |
| 4,342,569 A | * | 8/1982 | Hussmann ................ 95/124 |
| 4,383,959 A | * | 5/1983 | Sadler ...................... 264/86 |
| 4,459,177 A |   | 7/1984 | O'Hare |
| 6,116,034 A | * | 9/2000 | Alexeev et al. ............. 62/92 |
| 6,453,684 B1 | * | 9/2002 | Spletzer et al. ............ 62/93 |
| 6,574,979 B2 | * | 6/2003 | Faqih ....................... 62/285 |
| 6,799,430 B2 | * | 10/2004 | Steiner ..................... 62/93 |
| 7,008,515 B1 | * | 3/2006 | Husson et al. ............ 202/83 |
| 2003/0167779 A1 | * | 9/2003 | Steiner ................... 62/93 |

FOREIGN PATENT DOCUMENTS

| CH | 608 260 | 12/1978 |
| DE | 197 34 887 A | 3/1999 |
| FR | 2 813 087 | 2/2002 |
| JP | 2004-316183 A | * 11/2004 |

* cited by examiner

*Primary Examiner*—Mohammad M. Ali
(74) *Attorney, Agent, or Firm*—Fasken Martineau DuMoulin, LLP

(57) ABSTRACT

The present invention is directed at a water collection device which condenses water vapour in atmospheric air to water. The device comprises means for drawing the atmospheric air into the device; means for condensing the moisture vapour in the atmospheric air into water, and means for collecting the water.

11 Claims, 13 Drawing Sheets

DEW POINT CALCULATION CHART
Ambient Air Temperature-Farenheit

| Relative Humidity | 20 | 30 | 40 | 50 | 60 | 70 | 80 | 90 | 100 | 110 | 120 |
|---|---|---|---|---|---|---|---|---|---|---|---|
| 90% | 18 | 28 | 37 | 47 | 57 | 67 | 77 | 87 | 97 | 107 | 117 |
| 85% | 17 | 26 | 36 | 45 | 55 | 65 | 75 | 84 | 95 | 104 | 113 |
| 80% | 16 | 25 | 34 | 44 | 54 | 63 | 73 | 82 | 93 | 102 | 110 |
| 75% | 15 | 24 | 33 | 42 | 52 | 62 | 71 | 80 | 91 | 100 | 108 |
| 70% | 13 | 22 | 31 | 40 | 50 | 60 | 68 | 78 | 88 | 96 | 105 |
| 65% | 12 | 20 | 29 | 38 | 47 | 57 | 66 | 76 | 85 | 93 | 103 |
| 60% | 11 | 19 | 27 | 36 | 45 | 55 | 64 | 73 | 83 | 92 | 101 |
| 55% | 9 | 17 | 25 | 34 | 43 | 53 | 61 | 70 | 80 | 89 | 98 |
| 50% | 6 | 15 | 23 | 31 | 40 | 50 | 59 | 67 | 77 | 86 | 84 |
| 45% | 4 | 13 | 21 | 29 | 37 | 47 | 56 | 64 | 73 | 82 | 91 |
| 40% | 1 | 11 | 18 | 26 | 35 | 43 | 52 | 61 | 69 | 78 | 87 |
| 35% | -2 | 8 | 16 | 23 | 31 | 40 | 48 | 57 | 65 | 74 | 83 |
| 30% | -6 | 4 | 13 | 20 | 28 | 36 | 44 | 52 | 61 | 69 | 77 |

FIG.3

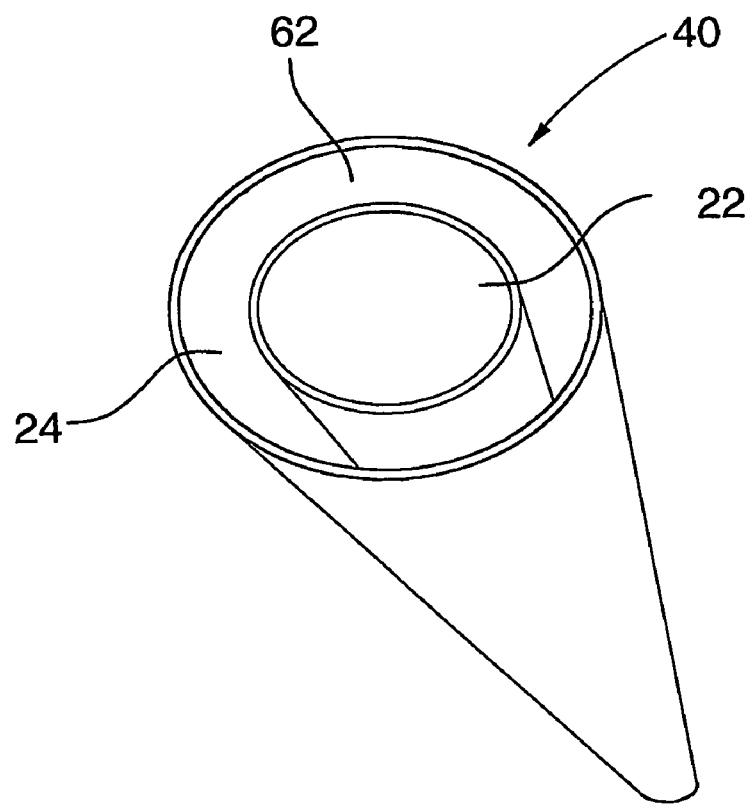
FIG.9
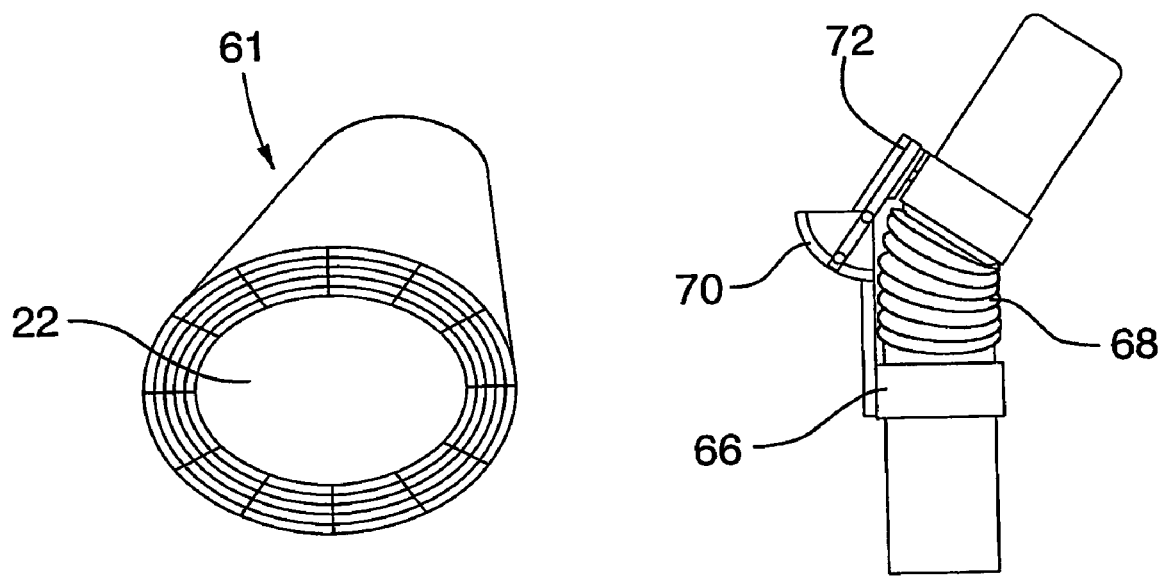
FIG.10
FIG.11

DEVICE FOR COLLECTING ATMOSPHERIC WATER

CROSS-REFERENCE TO RELATED APPLICATIONS

This application claims priority from U.S. Provisional Patent Application No. 60/385,894, entitled ATMOSPHERIC WATER COLLECTION DEVICE, filed Jun. 6, 2002.

FIELD OF THE INVENTION

The present invention relates in general with water collection and more specifically to an atmospheric water collection device.

BACKGROUND OF THE INVENTION

In recent years, global concerns regarding insufficient potable water sources have grown to epidemic proportions. The most viable sources of fresh water include water provided by lakes, rivers, and artesian wells. Unfortunately, these water sources are not sustainable and continue to decline both in capacity and purity at an alarming rate. As each year passes, the problem worsens due to factors such as climate changes, environmental pollution, and population growth. In a growing number of regions of the world there is inadequate water for industry, agriculture and/or drinking.

Some methods for the production of fresh water include the extraction of fresh water from salt water through desalinization processes such as eletrodialysis, and reverse osmosis. Unfortunately, many of these processes produce considerable pollutants and are costly and impractical for application where power is not readily available. In addition, there is the need for water transport systems to transport the water to inland locations which poses a lack of economic feasibility.

Overall, approximately five hundred and seventy seven thousand km$^3$ of water evaporates into the atmosphere from water bodies and the Earth's surface each year with the greatest percentage of water in atmospheric air remaining closest to the Earth's surface. Unfortunately, this major renewable source of water is hardly being utilized.

Current technology is highly dependant on electricity to power devices that attempt to create water from condensing atmospheric air through means that utilize fans, pumps, and refrigeration units. These technologies are not suitable for much of the world's population where artificial power sources are not readily available.

One prior art attempt at a means to draw water from air without the need for an applied power source is a project in Chile that uses large nets to capture water from fog. Unfortunately, this process can only be used in select areas where the presence of fog is frequent and predictable.

Therefore, there is provided an improved atmospheric water collection device which overcomes the disadvantages of the prior art.

SUMMARY OF THE INVENTION

It is an object of the present invention to obviate or mitigate at least one disadvantage of previous water collection devices.

The present invention is directed to a device that extracts moisture vapor from atmospheric air for use as a fresh water source. This device is simple, practical, and economical while offering an advantage over conventional technology. The preferred embodiment utilizes resources such as the earth, sun, and wind to enable its function.

The water collection device of the present invention provides flexibility over prior art devices, allowing for productive installations in most regions of the world. As the water collection device's preferred power source is passive solar energy, the amount air flow within the device increases as installations of the device get closer to the equator where it is hotter year round.

The device's function may also be enhanced through the use of materials designed to fit within the device that allow for an increase in the surface area upon which condensation occurs. For example, the device could use metal configurations such as is seen in radiators and air conditioners. Alternatively, more easily attainable materials such as rocks or pebbles could be used, providing passage for air while increasing the surface area upon which condensation may occur.

Although the preferred embodiment does not depend on an artificial power source of any kind, supplemental applied power may be utilized to power fans to assist airflow through the device. This may be achieved through the use of a solar panel and battery situated beside the water collection device. Other more conventional applied power sources may also be utilized to improve the device's capability to condense water vapour to collect water.

In another design adaptation, the use of a reflective backdrop for those areas where the sun does not travel directly overhead may be used. For installations that are a considerable distance from the equator, a reflective stand may be used to redirect and focus solar energy into the device In a first aspect, the present invention provides a water collection device for condensing moisture vapour in atmospheric air into water, comprising means for drawing the atmospheric air into the device; means for condensing the moisture vapour in the atmospheric air into water; and means for collecting the water.

In a further embodiment, there is provided a water collection device for collecting water from moisture vapour in atmospheric air comprising a solar heating device; a storage tank for collecting the water; at least one convection tube, connected at one end to the solar heating device and at a second end to the storage tank; and at least one condensation tube for intaking the atmospheric air into the device at one end and connected to the storage tank at a second end; wherein when the solar heating device and the at least one convection tube are heated up, a vacuum is created within the device which assists in drawing the atmospheric air into the device via the at least one condensation tube; wherein after the atmospheric air is drawn in, the air is cooled in the at least one condensation tube such that the water vapour within the air is condensed to water and collects in the storage tank; and wherein uncondensed air is then drawn up the convection tube by the vacuum and returned to the atmospheric air.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a chart relating percentage relative humidity and air temperature.

FIG. 9 is a perspective view of a counter-flow heat exchanger.

FIG. 10 is a view of a second embodiment of an air-cooling device insert.

FIG. 11 is a side view of the solar reflector adjustment mechanism.

DETAILED DESCRIPTION

Generally, the present invention provides a method and system for collecting water from atmospheric air.

Figure 1:
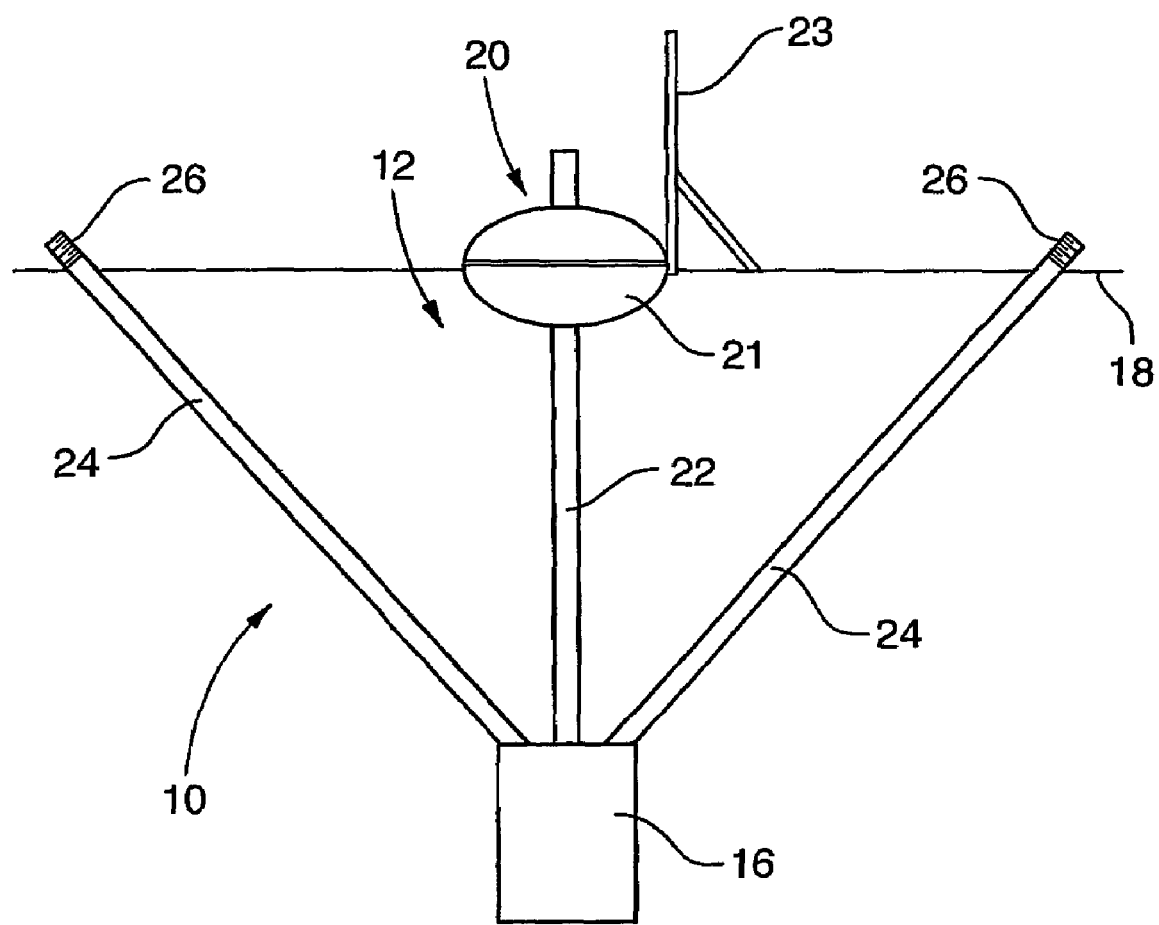
FIG. 1 is a side view of an atmospheric water collection device in accordance with the present invention

Turning to FIG. 1, a side view of a water collection device is shown and indicated as 10. The water collection device 10 comprises means for drawing atmospheric air 12 into the device 10, and means for collecting the water 16, seen as a storage tank. The water is condensed from the atmospheric air. In the preferred embodiment, a large portion of the collection device 10 is located under ground level 18 to facilitate condensing of the moisture vapour as will be described herein below.

The means for drawing atmospheric air 12 comprises a solar heating device 20, seen as a solar oven 21 and reflector apparatus 23, connected to a convection tube 22 which, in turn is connected to the means for collecting the water 16. An inexpensive version of the reflector apparatus may be made using a piece of cardboard covered with tinfoil or other reflective materials. The means for drawing atmospheric air 12 further comprises a pair of condensation tubes 24 which intake the atmospheric air. It will be understood that although only one convection tube and two condensation tubes are shown, any number of tubes may implemented. The above ground end of the condensation tube 24 includes an intake filter 26 to limit the amount of solid particulate from entering the device 10.

The depth that the storage tank 16 is buried underground is based on the determination of a dew point temperature of the area where the device 10 is located. The "dew point temperature" represents the temperature where atmospheric air can hold no more water and thus water is forced to collect on surrounding surfaces as dew. When this occurs, the air is said to be at 100% humidity, or saturation. Air with a relative humidity (RH) of 50% holds half of the total amount of water vapor it can hold at its dew point temperature. The amount of water vapor that air holds is directly proportional to the air temperature itself. Therefore, if air temperature decreases, the maximum amount of water vapor the air holds also decreases. For example, if air at 70° F. and 50% relative humidity is cooled to 52° F., the relative humidity will reach 100% (saturation) and condensation will begin. Once the relative humidity and temperature of a location is known, the dew point temperature may be calculated.

Figure 2:
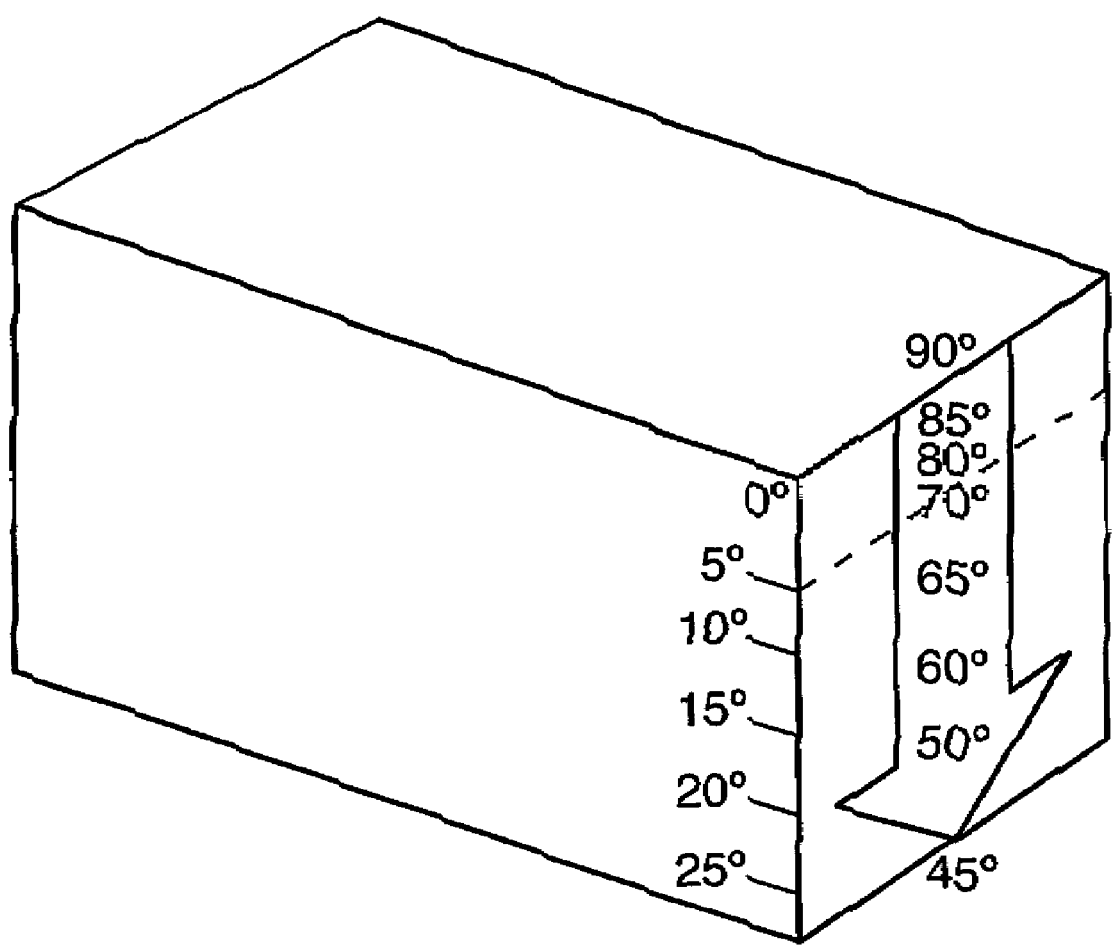
FIG. 2 is a perspective view of a block of earth showing average summer ground temperatures.

A sample calculation to determine the burial depth of the storage tank 16 is now described with reference to FIGS. 2 and 3 which display a perspective view of a block of ground showing average summer ground temperatures for a location and a chart relating the percentage relative humidity and air temperature to determine the dew point temperature, respectively. When the relative humidity and the temperature of a given location are known, the "dew point temperature" may be calculated. After determining the dew point temperature, reference is made to FIG. 2 to estimate how far down into the Earth the atmospheric air must travel in order to condense to water. With this information, an approximate range of operation for the device is determined.

If the temperature is 90° F. and the relative humidity is 55%, the intersection of the row and the column indicates that the dew point is reached at a temperature of 70° F., or below. This means that moisture vapor in the air at 90° F./55% RH condenses on any surface that is at, or below, the dew point temperature of 70° F. By referring to FIG. 2, to reach a ground temperature of 70° F., a 5-foot deep hole is required. Therefore, with the storage tank buried at a depth greater than 5 feet, the moisture vapour in the storage tank condenses to water.

In operation, the water collection device 10 utilizes the properties of hot air in order to draw in the atmospheric air via the condensation tubes 24. The solar heating device 20 serves as a heating element that heats the air in the convection tube 22 to a temperature which is higher than the atmospheric air, so that the air in the convection tube 22 is forced to rise. in order to further assist in retaining the heat energy, dense materials which hold heat energy may be placed within the solar oven. This creates a vacuum within the device 10 since the temperature in the convection tube 22 is higher than the temperature of the surroundings area. The solar heating device 20 also sustains these high temperatures within the device 10. As the overall device 10 operates on a closed system, the air generally enters the device 10 via the intake filters 26 located at the end of each condensation tube 24. The vacuum created by the solar heating device 20 and the convection tube 22 draws the atmospheric air through the condensation tubes 24 to the storage tank 16 and up through the convection tube 22. As shown in FIG. 1, most of condensation tubes 24 is preferably located below ground level 18.

As the atmospheric air flows down the condensation tube 24, decreasing temperatures beneath the Earth's surface force the air to cool. When the dew point temperature is reached underground (i.e. at a depth of 5 feet), the moisture vapour in the air condenses to water. Gravity then draws the water down the condensation tubes 24 into the storage tank 16. The storage tank 16 preferably keeps the water at cool temperatures, reducing the potential for microbial contamination. Any uncondensed air then leaves the storage tank 16 and travels up the convection tube 22 before escaping the device.

Figure 4:
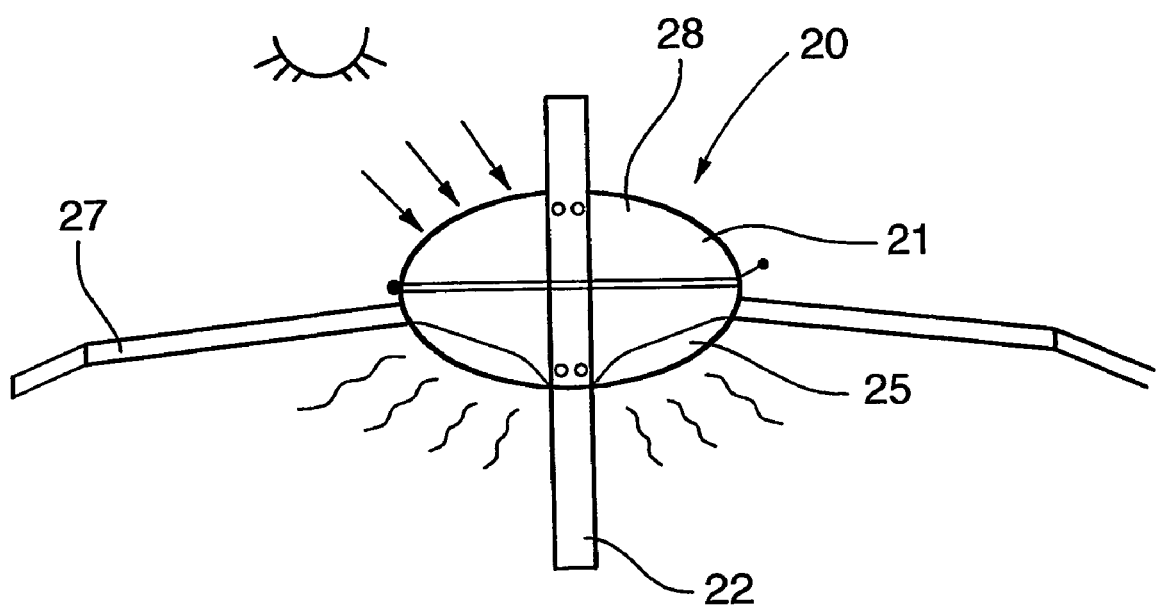
FIG. 4 is a side view of a second embodiment of a solar heating device for the atmospheric water collection device of claim 1.

Turning to FIG. 4, a cross sectional side view of a second embodiment of a solar heating device 20 is shown. The solar heating device 20 comprises an insulation barrier 27 as a means to contain and better utilize the heat energy produced by the solar heating device 20. The solar heating device 20 includes a reflector apparatus seen as a hollowed half-sphere (or any shape) collector bowl 25 designed to gather and store solar energy. As described in FIG. 1, the preferred position of the solar heating device 20 is situated with the rim just above ground level. The internal colour of the bowl 25 is preferably black or a reflective silver to attract the sun's rays. A transparent cover 28 matching the shape of the base of the bowl 25 may be used to create a membrane that allows the sun's rays to pass through while creating a barrier to retain heat energy within the solar heating device 20. As with the preferred embodiment, the convection tube 22 is located between the storage tank (not shown) and the solar oven and extends through the collector bowl 25 and beyond the transparent cover 28 and opens into the air which increases air flow by allowing air to circulate between the solar oven 21 and the convection tube 22 in such a way as to take greater advantage of the heat inside the solar oven 21. The air in the convection tube 22 is exchanged with the air inside the solar heating device 20.

By including the insulation barrier 27, heat storage is increased. The insulation barrier 27 is preferably constructed using one or more layers of water resistant polythylene and one or more layers of insulation to keep the Earth dry and hold in the heat energy as a means to channel heat energy back into the convection tube 22. Moreover, as temperatures in the solar oven 21 increase, the heat energy is stored in the Earth's mass surrounding the outside of the collector bowl 25. Since heat energy travels the path of least resistance, without the insulation barrier 27, most of the heat energy stored in the Earth escapes the water collecting device 10 and travels through the Earth surrounding of the device rather than back into it, thereby possibly affecting the amount of water that the device collects. The insulation barrier 27 causes the heated air to return to the solar oven 21 so that operation of the water collection device may continue even after the sun goes down.

Figure 5:
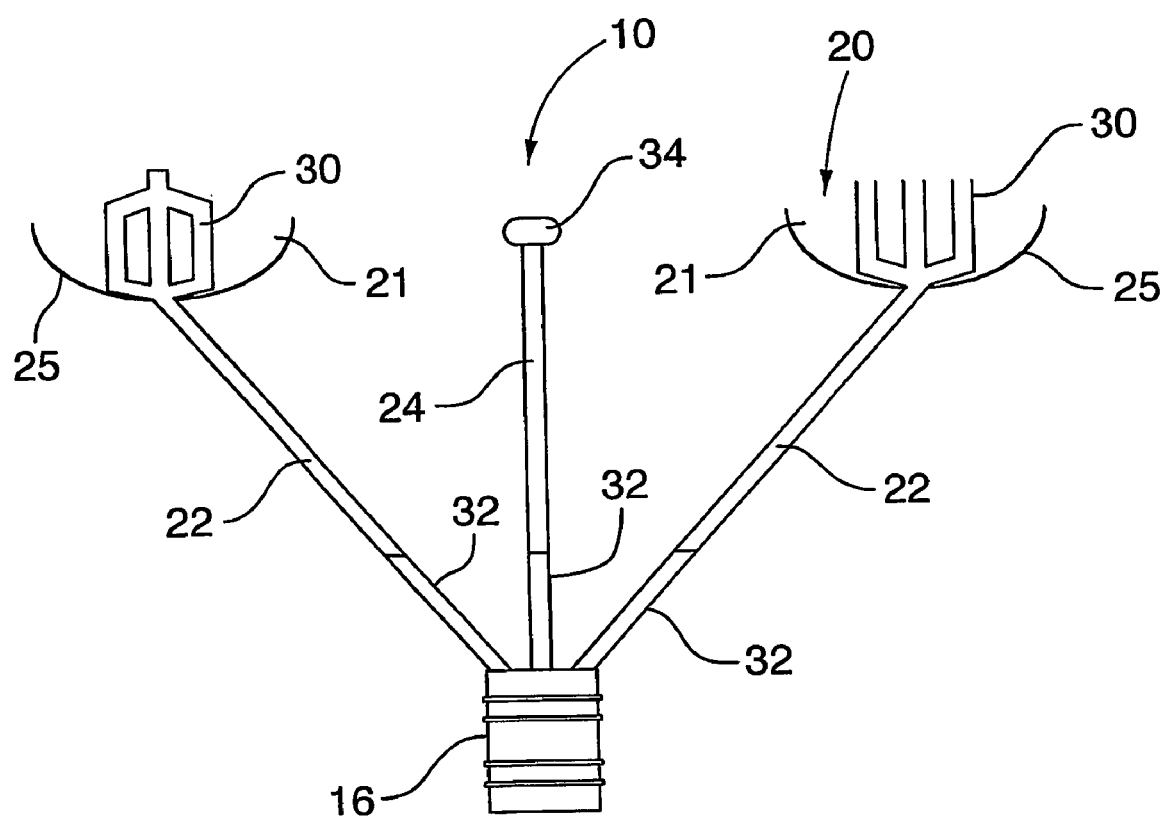
FIG. 5 is a side view of a third embodiment of a water collection device.

Turning to FIG. 5, a further embodiment of a water collection device is shown. In this embodiment, the device 10 includes two convection tubes 22 and one condensation tube 24. This embodiment allows for the movement of larger volumes of air through the device. Each of the convection tubes 22 are preferably fitted with solar ovens with reflectors but may be fitted with a configuration of pipes 30 with a reflective bowl 25 that assist in heating the pipes 30 causing air to expand and rise performing a task similar to the solar ovens 21 as described above. This embodiment also includes an air-cooling device 32 comprising various materials that increases the surface area upon which the water vapour condenses. The air cooling devices 32 are located inside the condensing tube 24, convection tubes 22 or the storage tank 16. The present water collecting device is manufactured using materials that increase the surface area that the water vapour with in the atmospheric air may condense allowing for greater quantities of water to be collected. The condensing tube 24 may be fitted with an air filter 34 to reduce the amount of solid particulate entering the device As discussed above, atmospheric air is drawn into the device, via the condensation tube 24, by the solar heating devices 20. The air travels down the condensation tube towards the storage tank 16. As the air travels, the moisture in the air condenses against the side of the condensation tube 24 and the air-cooling insert 32, and the water is drawn by gravity into the storage tank 16. The uncondensed air then travels up through the convection tubes 22 and escapes back into the atmosphere. By installing cooling devices 32 within the convection tubes 22, water may be collected more efficiently, resulting in less uncondensed air traveling out of the device. As before, gravity draws the water collected in the cooling devices within the convection tube 22 into the storage tank 16.

Figure 6:
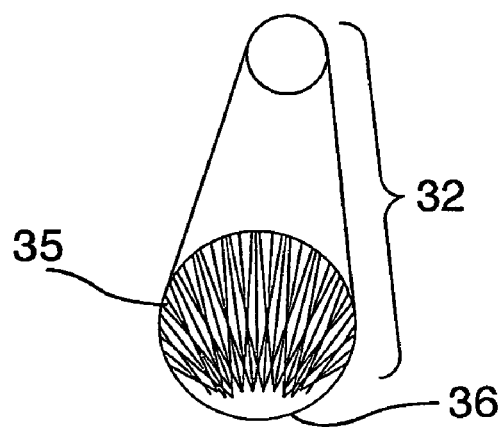
FIG. 6 is perspective view of an air-cooling device.

Turning to FIG. 6, a perspective view of the cooling device, in the form of an insert, is shown. In order to increase the amount of water collection via condensation, the cooling device 32 is inserted within a condensing tube 24 and/or a convection tube 22. For greater efficiency, the length, L of the cooling insert and the type of the air cooling material is selected to maximize the surface area upon which water vapour condenses while allowing for as much airflow as possible through the tube(s). FIG. 6 illustrates a cooling device comprising hygroscopic fibers as a means to enhance water collection. As water is condensed, the water drips to the bottom 36 of the cooling insert 32 and then into the storage tank 16. In order to replace or modify these inserts 32, the device 10 need not be dug up as these inserts 32 may be constructed in such a manner as to be slightly smaller in diameter than the condensing of convection tubes allowing them to be slidably removed.

Figure 7:
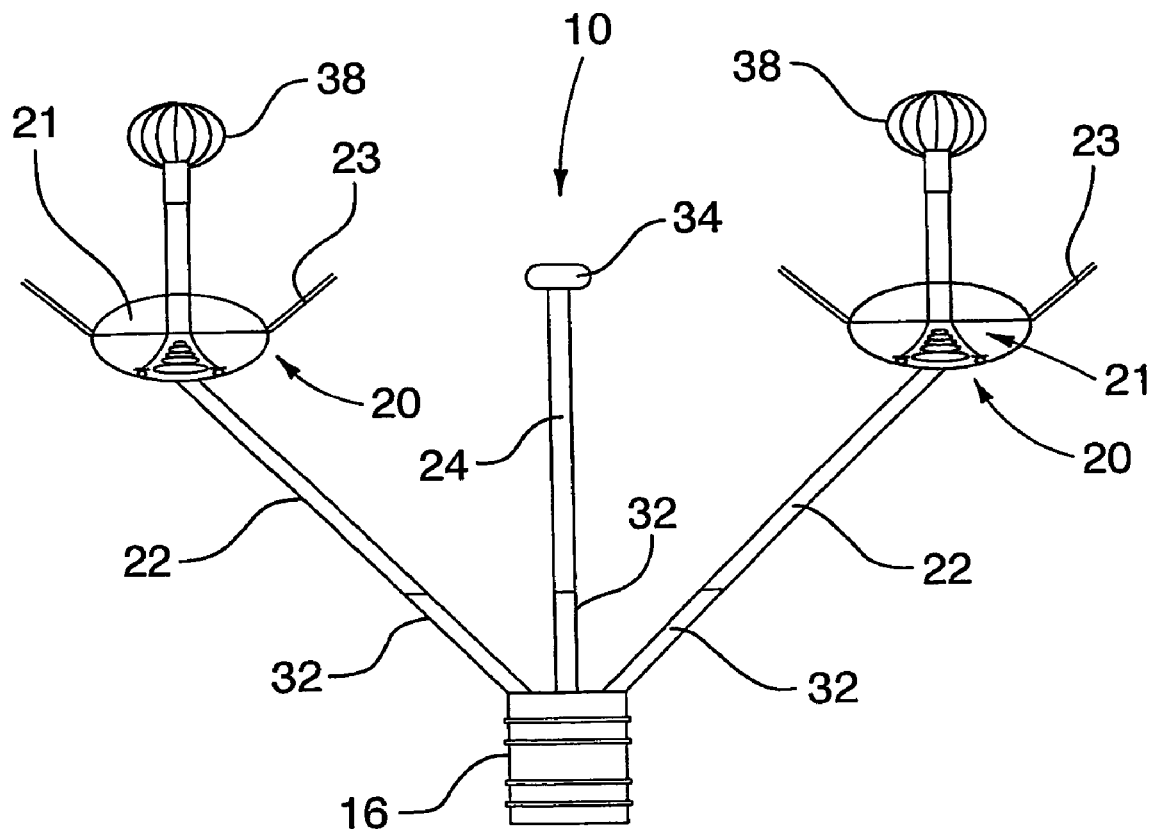
FIG. 7 is a side view of another embodiment of an atmospheric water collection device.

Turning to FIG. 7, a side view of yet another embodiment of a water collection device 10 is shown. In this embodiment, multiple solar ovens 21 with solar reflectors 23 are used. Whirlybirds 38 are situated on top of each convection tube to increase airflow by taking advantage of wind to assist in creating the vacuum to draw air into the device. The solar reflectors 23 are used to focus heat energy and increase the temperatures of the air inside the solar oven 21 and convection tube 22.

As air is drawn into condensation tube 24 via the intake filter 34 and travels down the condensation tube 24, the air passes through an air cooling insert 32 which assists in condensing the moisture vapour in the air to water which is then stored in the storage tank 16. The uncondensed air then travels up through the convection tubes 22, through the solar oven 21 and whirlybird 38, into the surrounding air. As described with respect to FIG. 6, the water vapour in the uncondensed air may still condense while passing by the cooling devices 32 located within the convection tubes 22.

Figure 8:
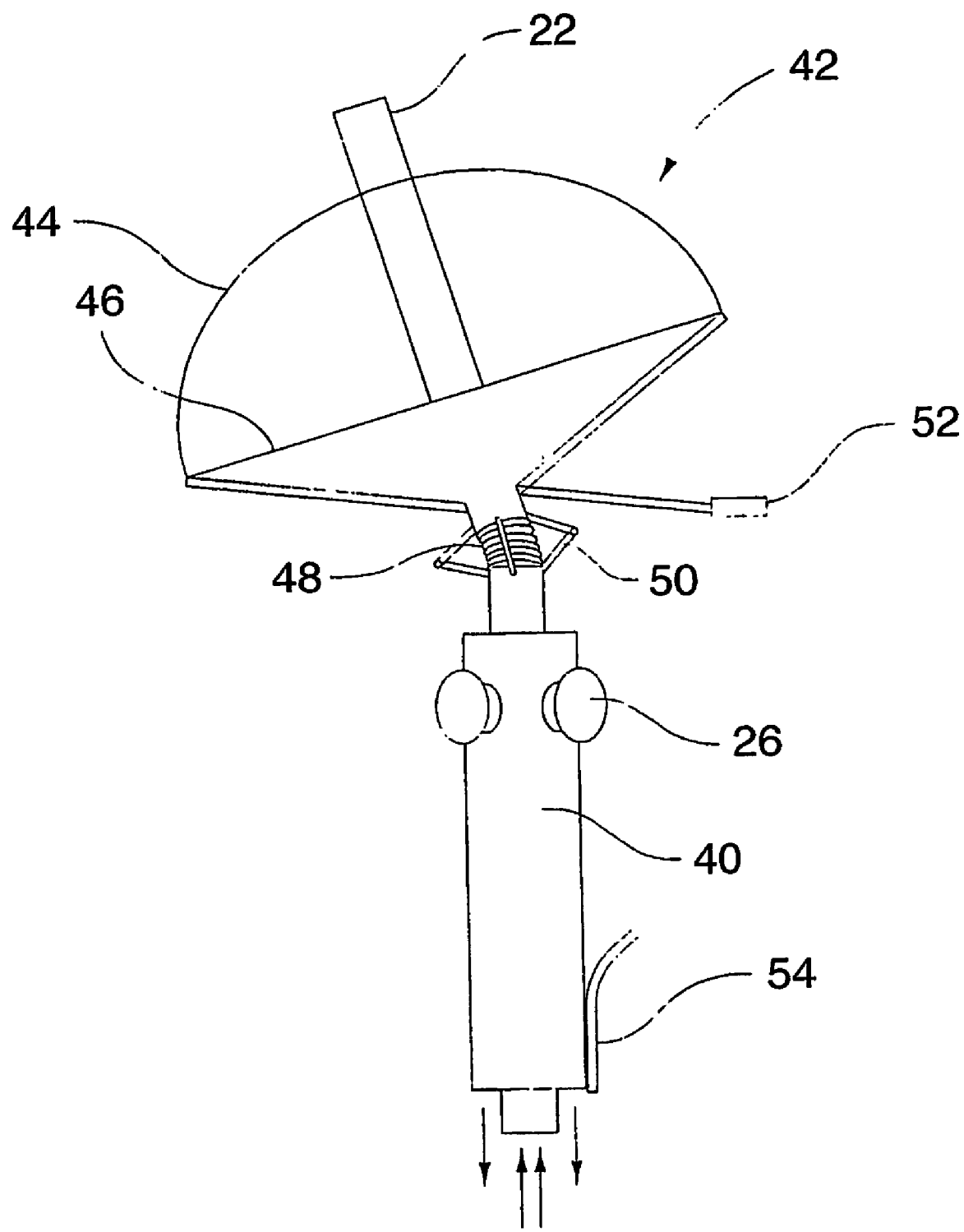
FIG. 8 is a side view of an upper portion of yet another embodiment of an atmospheric water collection device.
Figure 8A:
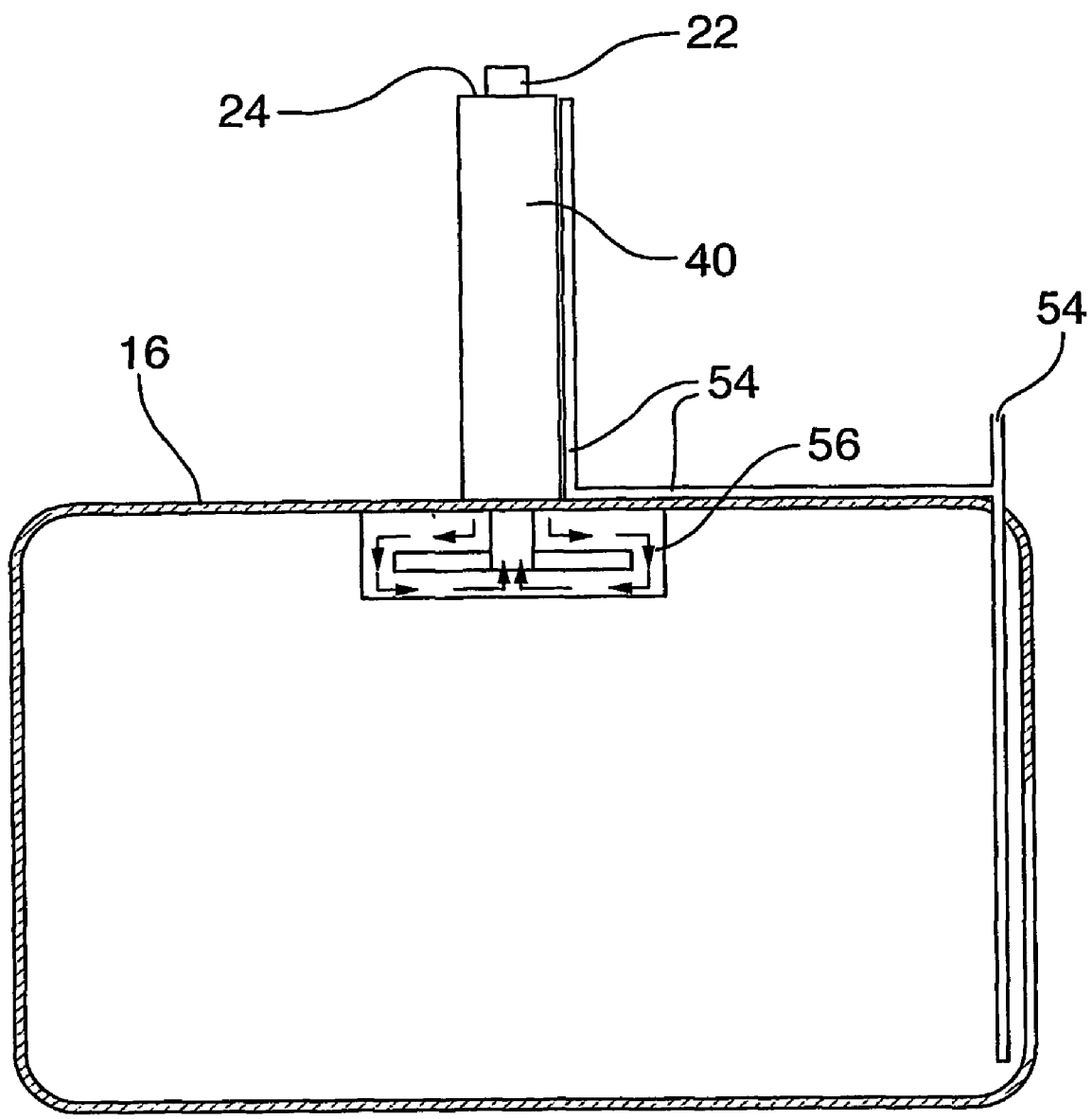
FIG. 8a is a side view of a lower portion of the water collection device design of FIG. 8.

Turning to FIGS. 8 and 8a, another embodiment of a water collecting device including a counter-flow heat exchanger 40 and movable solar reflector apparatus 42 is shown. The heat exchanger 40 and movable solar apparatus 42 assist in using the sun's energy to create a vacuum which draws atmospheric air into the device 10. The movable solar reflector apparatus 42 includes a transparent cover 44 attached to a reflective dish 46 to capture heat energy from the sun. The movable apparatus 42 allows for the sun's rays to be aimed on the upper portion of the convection tube 22 allowing the air in the tube 22 to be heated to a temperature which is higher than the temperature of the surroundings. The transparent cover 44 also serves as a door to trap heat energy within the convection tube 22 and solar apparatus 42.

The mobility of the solar reflector apparatus 42 is due to a flexible hose 48 that allows the upper portion of the convection tube to freely move. If necessary, a support 50 is also connected to the hose to support the weight of the solar reflector apparatus 42. The movement of the apparatus is controlled by a handle 52 but may also be set up on a timer based on the earth's rotation or configured to move with the sun through any number of available mechanisms. One mechanism includes a small motor and gear assembly that is driven by a timer circuit. Alternatively, there may be a mechanism that is wound up each morning and tracks the sun until the sun goes down at the end of the day.

The counter-flow heat exchanger 40 enhances the performance of the device 10 by providing a more efficient utilization of convection between the different temperatured air within the device 10 since the convection tube 22 is contained within the condensing tube 24. Atmospheric air passes through the air filters 26 into the condensing tube 24. The air then travels within the exchanger and enters into the storage tank 16 as shown in FIG. 8*a*. As the warm air is traveling down the condensing tube 24, heat energy is exchanged with the cooler dry air that is traveling up the convection tube 22 from the tank 16. The heat exchanger 40 assists in warming the cool dry air that is forced out of the device 10 allowing for an increase in the vacuum. As well, the exchanger 40 helps to cool the warm air entering the device as it travels down the condensing tube 24. Water may be pumped up from the storage tank 16 through a water line 54 that travels from the storage tank 16 to the surface of the Earth or transported to a nearby dwelling.

A closer look at FIG. 8*a* reveals a cross-sectional side view of the lower portion of the water collection device 10. This illustration shows the counter-flow heat exchanger 40 attached to the storage tank 16. The atmospheric air travels down the condensing tube 24 before it enters into an air-cooling device 56. The air cooling device 56 is used to increase the surface area upon which condensation occurs. Alternatively, cooling devices may be installed inside the condensing tube 24 and/or convection tube 22, enhancing the water collection of the device.

Turning to FIG. 9, perspective view of a counter-flow heat exchanger 40, as described with respect to FIGS. 8 and 8*a* is shown. The exchanger 40 provides an exchange of energy between the condensing tube 24 and the convection tube 22. The exchanger 40 is preferably situated between the storage tank 16 and the solar oven 21, or a combination of both. As shown, the convection tube 22 is contained within the condensing tube 24 allowing for an efficient exchange of heat in the device 10. As warm air enters into the condensation tube 24, the air travels down the space 62 between the two tubes to the storage tank 16 whereby the cooled, uncondensed air then travels up the convection tube 22. The air moving down the condensing tube 24 is cooled by the air that is traveling upward inside the convection tube 22. This embodiment allows for increased efficiency in both cooling the warm air as it travels down into the Earth and by warming the cool dry air as it works its way up and out of the device 10.

FIG. 10 provides a view of an open end of an air-cooling device insert 61 designed to be situated in the space 62 between the convection tube 22 and the condensing tube 24. It will be understood that the insert 61 is designed to slidably fit within the space 62. As air travels past the increased surface area provided by the insert 61, water collection via the moisture from the atmospheric air may be enhanced. Alternatively, the air cooling device insert 61 may be placed in the convection tube 22 or in each of the condensing tubes.

FIG. 11 is a side view of another embodiment of a solar reflector apparatus adjustment mechanism that allows for the solar reflective apparatus 42 to move and track the sun. The upper portion of the convection tube extending above the ground is fitted with any number of mechanisms that allow for the solar reflector apparatus 42 to track the sun. In this embodiment, support clamps 66 and a flexible hose 68 are attached to both the lower portion of the convection tube 22 and the upper mobile portion of the convection tube that extends through the center of the solar reflector apparatus 42.

The present embodiment allows for two specific movements. The tilt setting mechanism 70 allows the reflective apparatus 42 to be in line with the sun's path. The distance of the device 10 from the equator determines this angle. Installations near the equator will require little or no change from the default setting (straight up) and the adjustment mechanism may not be required at all for units installed near the equator.

A pivot point 72 allows the solar reflector to track the sun's movement and to maintain the high temperature in the upper portion of the convection tube 22. The pivot point 72 accommodates manual movement or automated movement for various embodiments.

Figure 12:
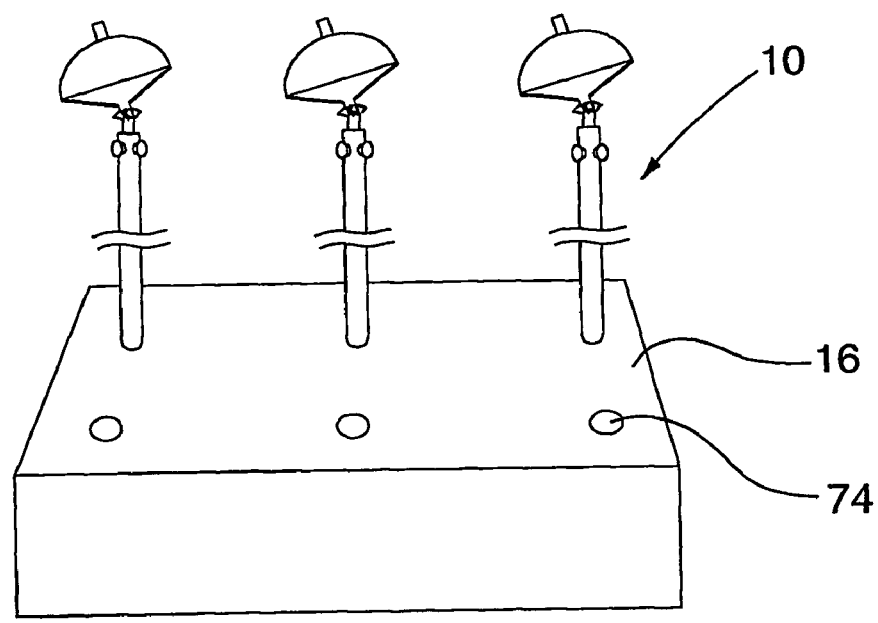
FIG. 12 is a perspective view of a multi-water collection device system.

FIG. 12 is a perspective view of a water collection system which is fitted for six water collection devices 10. Although, not shown, it will be understood that the front three circles 74 represent the location of three water collection devices 10. There is no limit to how many devices can be contained in the system as long as the storage tank is large enough.

Figure 13:
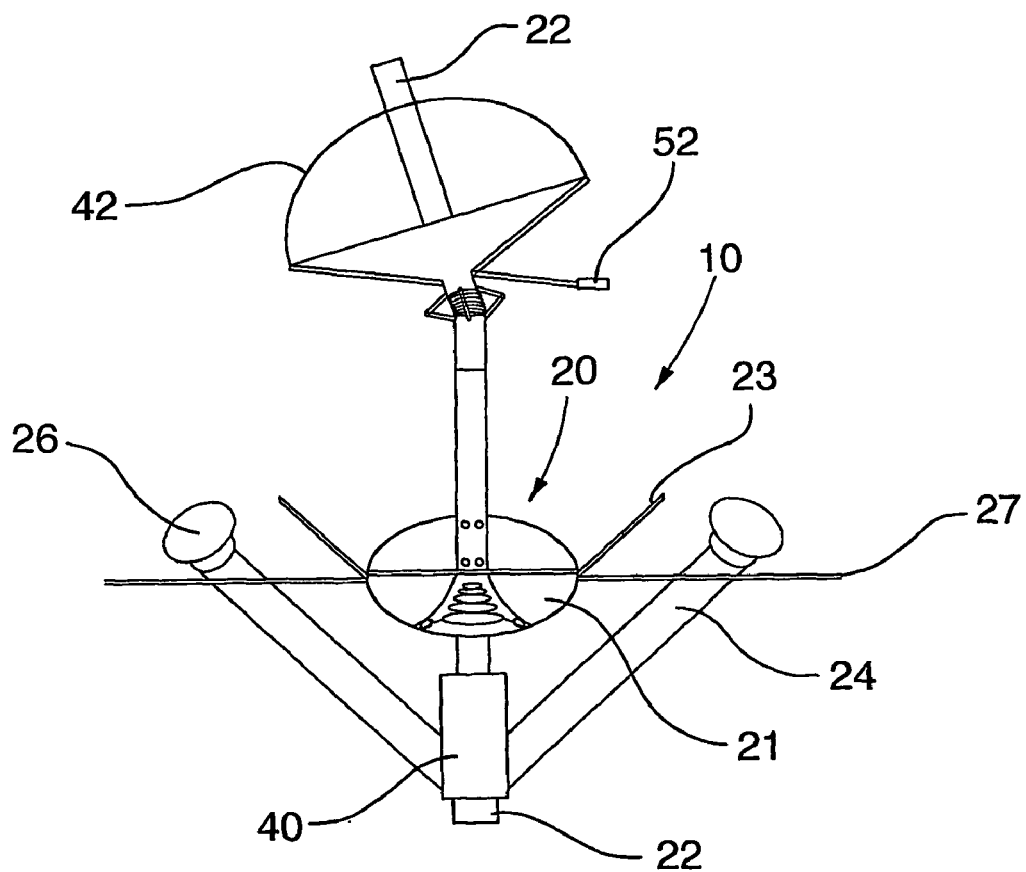
FIG. 13 is a side view of a further embodiment of an atmospheric water collection device.

Turning to FIG. 13, yet another embodiment of the water collection device is shown with a combination of both the solar heating device 20 and the movable solar reflector apparatus 42 to heat the convection tube 22. In this embodiment, a stronger vacuum may be created within the device 10 since there are two separate heating elements compared to devices with only either the solar heating device or the reflector apparatus 42. This embodiment allows for the storage of heat energy in the Earth as well as the ability to track and better utilize solar energy to heat the convection tube.

Atmospheric air enters the system through the air intake filters 26 at the openings of the condensing tubes 24. These separate condensing tubes 24 open into a single condensing tube that surrounds the lower portion of the convection tube 22 and serves as a heat exchanger 40. The solar heating device 20 draws this air down into the storage tank 16, through the air-cooling device (not shown), and then up the convection tube 22 where the air continues to rise to the upper portion of the convection tube 22 until it is expelled from the device 10. The interaction of the warm air entering the device and the cool air escaping the device within the heat exchanger 40 is described above. This embodiment illustrates the use of a solar heating device 20 that is attached to the movable solar reflector apparatus 42 and provides two means of heating the air. An insulation barrier 27 may also be included to improve performance.

Figure 14A:
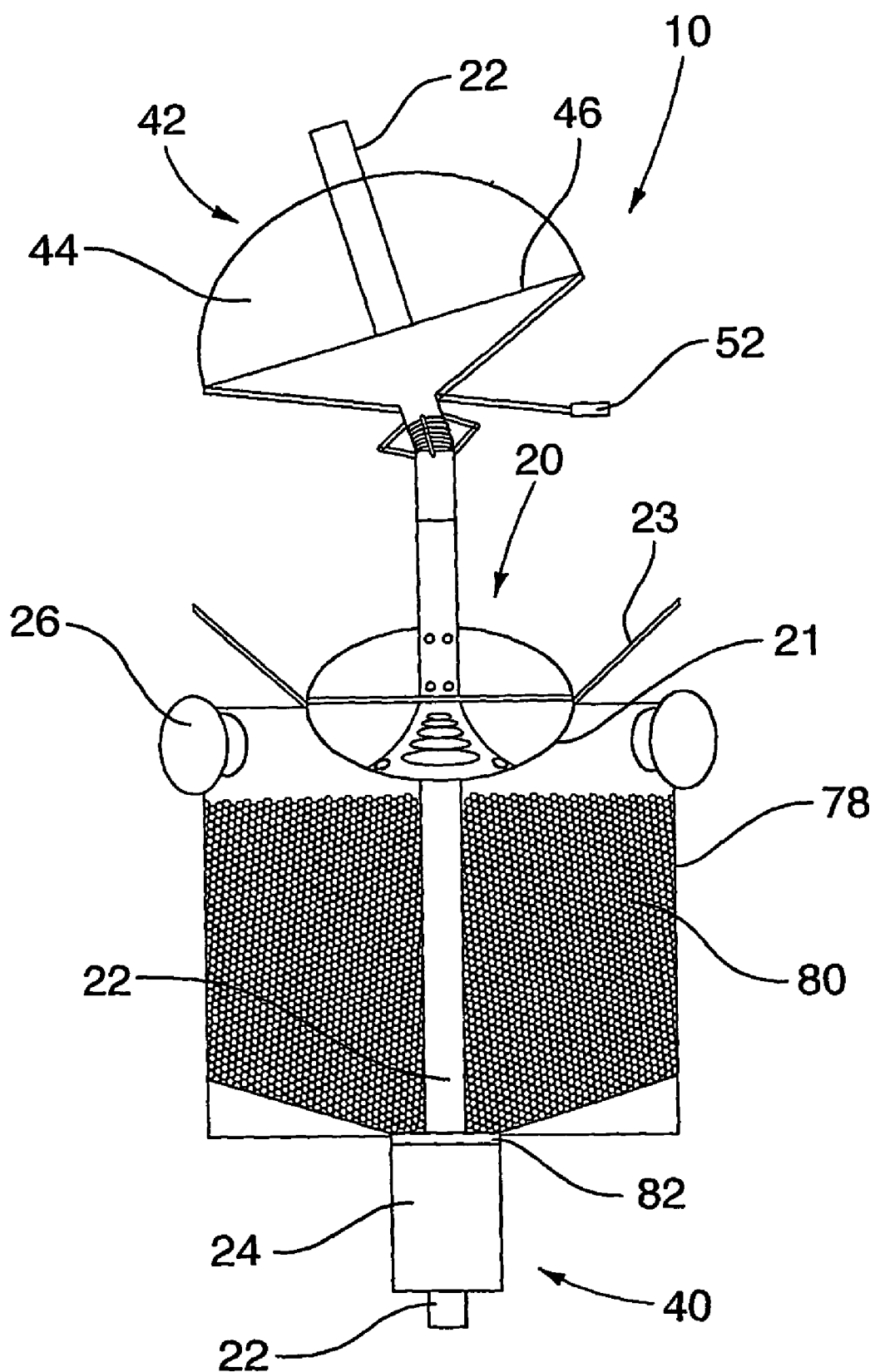
FIG. 14a is a side view of another embodiment of an atmospheric water collection device.

FIG. 14*a* is a cross section side view of another embodiment which utilizes adsorbent materials to collect water by absorbing and then desorbing moisture at varying temperatures. In this embodiment, the Earth is used as a cooling element in addition to using adsorbent materials to create water from the atmospheric air. A vacuum is created by heating the convection tube 22 via the reflector apparatus 42 and the solar oven 21 with solar reflectors 23. The vacuum draws the air in via the intake filters 26 into the adsorption chamber 78 allowing the moisture in the atmospheric air to be absorbed. The adsorption chamber 78 is partially or completely filled with an adsorbent material 80, such as montmorillonate clay or silica gel beads or other materials that absorb and desorb moisture within different temperature ranges. As temperatures become higher or lower than the threshold for the adsorbent materials (where they can hold water), the collected water is released from the material and stored in the storage tank. The adsorbent material 80 is placed on trays, inside porous containment materials such as nylon, or in any number of configurations that allow for air passage while absorbing and desorbing moisture.

As the warm air passes through and/or by the adsorbent material 80, this material collects moisture vapor. As temperatures change, the material 80 releases the moisture as water droplets which are then drawn down by gravity through a filter 82 that reduces the amount of solid particulates to pass into the condensing tube 24 to the storage tank 16. The air and water travel down the condensing tube 24 that surrounds the convection tube 22 into the storage tank 16. The cooled air then travels up through the convection tube and out of the device.

Figure 14B:
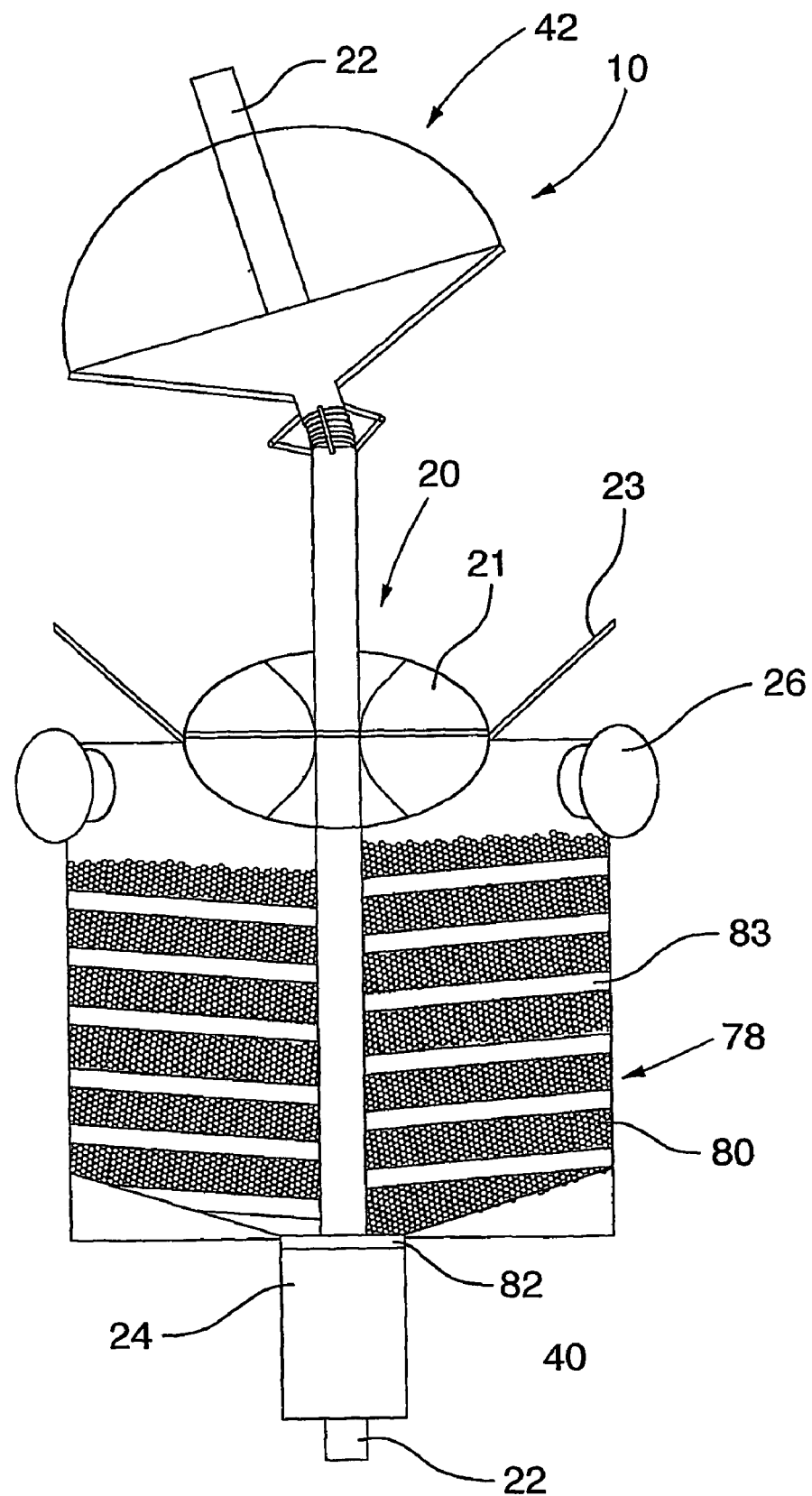
FIG. 14b is a side view of another embodiment of an atmospheric water collection device.

As shown in FIG. 14b, which provides a schematic diagram of another embodiment of the water collecting device, the adsorption chamber comprises a spiralling plate 83 that allows for the atmospheric air to travel down through the chamber 78.

Figure 15:
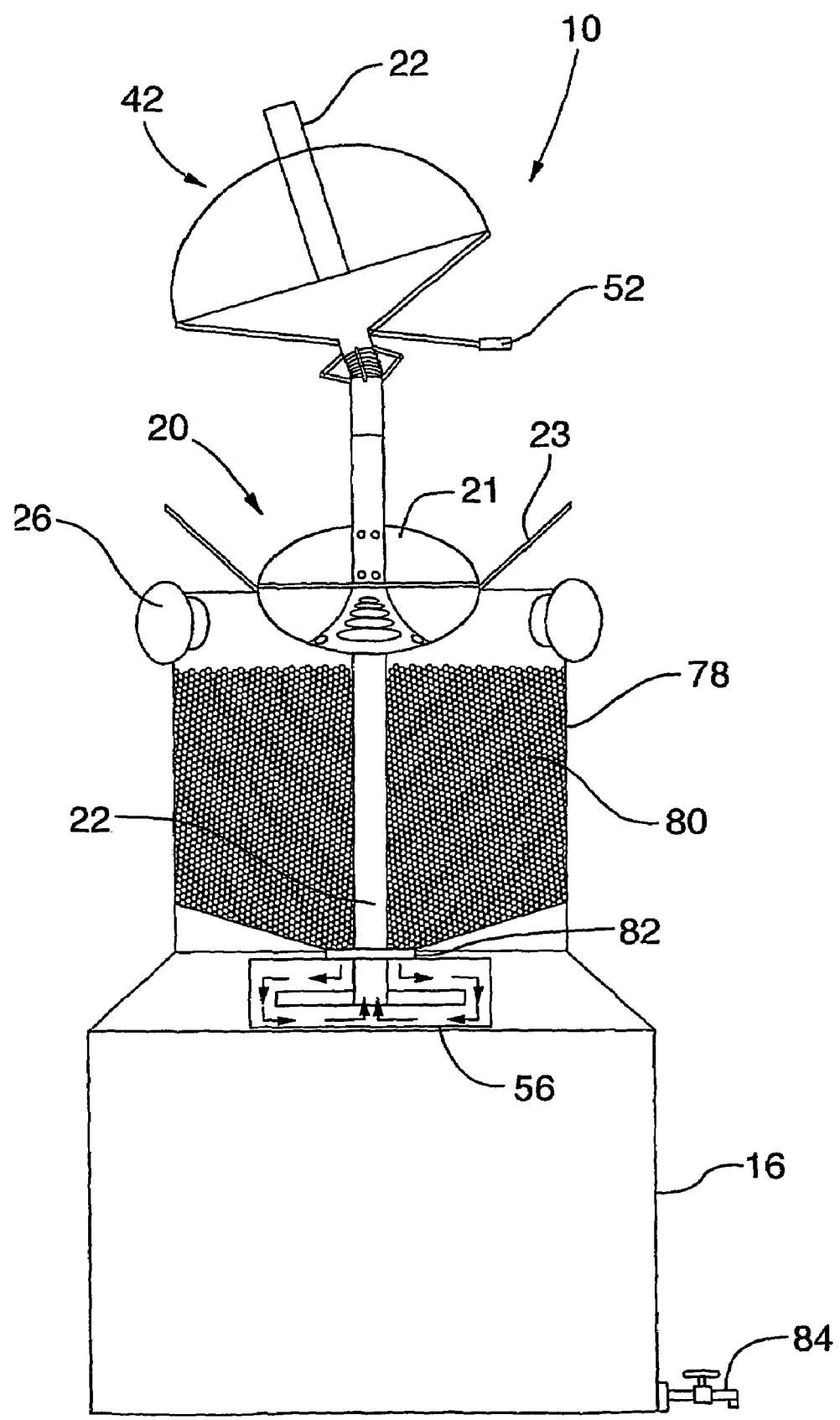
FIG. 15 is a side view of a portable embodiment of the atmospheric water collection device.

Turning to FIG. 15, a portable water collection device is shown. This design serves as a portable unit that does not utilize the Earth as a cooling element, and does not need to be located partially underground for its operation. In this embodiment, the storage tank 16 is located below the adsorption chamber 78 containing the adsorbent material 80. When the device cools at night the moisture is desorbed and drawn down to the storage tank 16 by gravity.

The storage tank is generally located directly below the adsorption chamber such that gravity draws water down directly into the storage tank. The air traveling through the device may move directly from the adsorption chamber 78 into the storage tank 16 and then up the convection tube 22 without obstruction. Depending on how the adsorbent material is situated in the adsorption chamber, a filter or membrane 82 may be required to allow only water to pass while keeping the adsorbent material contained within the adsorption chamber 78. With this embodiment, water may be accessed through a conventional tap 84 located near the bottom of the storage tank 16.

With only minor modifications this device may be utilized as a means to produce fresh water from salt water. In this embodiment, the water collection device is supported by anchoring and/or a floatation device(s) potentially allowing higher quantities of water to be condensed than if the device were buried in the earth. This is due to the high relative humidity directly over a body of water and the typically very cool temperatures of salt-water bodies. Preferably, the device floating on pontoons with a water line from the storage tank under water into dwellings on the waterfront.

In another embodiment, the device collects dew and rain water via a slightly concave tarp or tarps that empty into the convection tube(s) or condensing tube(s). While there are means to collect rainwater, it is usually done by collecting rooftop rainwater that is likely to be contaminated with bird droppings and dust. Our tarps used for this device can simply be rolled up when not in use, reducing potential for contamination.

Use of montmorillonite clay as the adsorption material provides an added advantage that at temperatures of below 50° C., the clay regenerates without substantial deterioration or swelling while at temperatures at or above 50° C., the clay desorbs rather than absorbs moisture so that the release of stored moisture is increased. With silica gel beads as the adsorption material, moisture is absorbed at temperatures between 0 and 105° C.

Furthermore, the reflector apparatus may also be a trough reflector. The trough reflector provides the advantage that it does not have to be moved in order to track the sun throughout the day but is adjusted according to the angle of the sun's path during the year.

It will be further understood that the water cooling device may further comprise means for water pasteurization. Due to the heat energy which is stored in the solar heating device and the resultant high temperature within the solar over, the collected water may be pasteurized.

The water pasteurization means comprises a transparent water jacket located around the solar over. The water jacket is preferably a bowl-shaped container manufactured out of a transparent plastic or even glass. Water from the storage tank is transported via a water line up to the water jacket. The UV radiation passes through the sides of the jacket to decontaminate the water. Once the water is free from contaminates, the jacket is preferably emptied via a release valve located at the bottom of the water jacket. The application of UV radiation as a disinfectant offers an effective water treatment alternative for developing countries. The water pasteurization system is both inexpensive, easy to use and may be constructed locally. Moreover, UV radiation uses approximately 40,000 times less primary energy than boiling water over a stove. The water pasteurization method also provides environmental advantages.

The above-described embodiments of the present invention are intended to be examples only. Alterations, modifications and variations may be effected to the particular embodiments by those of skill in the art without departing from the scope of the invention, which is defined solely by the claims appended hereto.

INDUSTRIAL APPLICABILITY

The present invention is directed at a water collection device which collects water by condensing atmospheric air.

What is claimed is:

1. A water collection device for collecting water from moisture vapour in atmospheric air comprising: a solar heating device; a storage tank for collecting said water; at least one convection tube, connected at one end to said solar heating device and at a second end to said storage tank; a solar reflector apparatus connected to said solar heating device; said solar reflector apparatus further comprises an adjustment mechanism for adjusting said solar heating device to follow the sun to maintain said vacuum; wherein said adjustment mechanism comprises a flexible hose and supports clamps and at least one condensation tube for intaking said atmospheric air into said device at one end and connected to said storage tank at a second end; wherein when said solar heating device and said at least one convection tube are to heated up, a vacuum is created within said device which assists in drawing said atmospheric air into said device via said at least one condensation tube; wherein after said atmospheric air is drawn in, said air is cooled in said at least one condensation tube such that said water vapour within said air is condensed to water and collected in said storage tank; and wherein uncondensed air is then drawn up said convection tube by said vacuum and returned to said atmospheric air.

2. The device of claim 1 wherein said at least one convection tube comprises a cooling device for cooling said uncondensed air to condense said moisture vapour to water.

3. The device of claim 1 wherein said at least one condensation tube comprises a cooling device for cooling said atmospheric air to condense said moisture vapour to water.

4. The device of claim 1 wherein said solar heating device comprises a solar oven and a reflector apparatus.

5. The device of claim 1 wherein at least one of said at least one convection tube is located inside a condensation tube to form a heat flow exchanger.

6. The device of claim 1 wherein said storage tank further comprises a water line for transporting said collected water.

7. The device of claim 6 wherein said water line comprises a tap spout for delivering said water.

8. The device of claim 1 further comprising an adsorption chamber located within said heat exchanger for absorbing said moisture vapour from said atmospheric air which is then desorbed and collected in said storage tank.

9. The device of claim 1 wherein said at least one condensation tube comprises an intake filter located at said end for reducing the number of solid particulates from entering said device.

10. The device of claim 1 further comprising means for pasteurizing said water.

11. The device of claim 4 wherein said reflector apparatus is a trough reflector.

* * * * *